United States Patent
Pletersek et al.

(10) Patent No.: US 9,940,570 B2
(45) Date of Patent: Apr. 10, 2018

(54) RADIO FREQUENCY SYSTEM AND METHOD FOR LIMITING A VOLTAGE

(71) Applicant: ams AG, Unterpremstaetten (AT)

(72) Inventors: Anton Pletersek, Orehova Vas (SI); Vinko Kunc, Ljubljana (SI)

(73) Assignee: AMS AG, Unterpremstaetten (AT)

( * ) Notice: Subject to any disclaimer, the term of this patent is extended or adjusted under 35 U.S.C. 154(b) by 26 days.

(21) Appl. No.: 15/027,992

(22) PCT Filed: Aug. 18, 2014

(86) PCT No.: PCT/EP2014/067592
§ 371 (c)(1),
(2) Date: Apr. 7, 2016

(87) PCT Pub. No.: WO2015/051939
PCT Pub. Date: Apr. 16, 2015

(65) Prior Publication Data
US 2016/0253587 A1   Sep. 1, 2016

(30) Foreign Application Priority Data
Oct. 8, 2013   (EP) .................................... 13187729

(51) Int. Cl.
*G06K 19/07*   (2006.01)
*G06K 19/077*   (2006.01)

(52) U.S. Cl.
CPC ... *G06K 19/07773* (2013.01); *G06K 19/0704* (2013.01); *G06K 19/0709* (2013.01); *G06K 19/0715* (2013.01); *G06K 19/0723* (2013.01)

(58) Field of Classification Search
CPC .......... G06K 19/0723; G06K 19/0715; G06K 19/0701; G06K 19/07749; G06K 19/0709; G06K 19/07773; G05F 1/10
See application file for complete search history.

(56) References Cited

U.S. PATENT DOCUMENTS 6,487,100 B2 * 11/2002 Watanabe .......... G06K 19/0701
  363/127
6,747,548 B1 * 6/2004 Yamaguchi ........ G06K 19/0701
  340/10.1

(Continued)

FOREIGN PATENT DOCUMENTS

EP   1560147 A2   8/2005
FR   2751148 A1   1/1998

OTHER PUBLICATIONS

Chao, I-Jen et al.: "An Inductively Powered Converter for Implantable Biochemical Sensor Signal Processing System", IEEE 2009, 978-1-4244-2587-7/09, pp. 1-4.

*Primary Examiner* — Christopher Stanford
(74) *Attorney, Agent, or Firm* — McDermott Will & Emery LLP

(57) ABSTRACT

A radio frequency system has a first and a second antenna terminal, a radio frequency transceiver coupled to the antenna terminals, a rectifier connected to the antenna terminals at its input side and a voltage limiter. The voltage limiter comprises a first and a second input terminal connected to the antenna terminals, and a first and a second diode element connected between the first respectively the second input terminal and a bias terminal. A regulation transistor is connected between the bias terminal and the reference potential terminal. A voltage controller has a reference input for receiving a reference signal, a feedback input connected to the bias terminal and a control output for providing a control potential to a control terminal of the regulation transistor on the basis of the reference signal and a signal at the bias terminal.

19 Claims, 3 Drawing Sheets

(56) References Cited

U.S. PATENT DOCUMENTS

| | | | | |
|---|---|---|---|---|
| 7,482,930 B2* | 1/2009 | Song | ............... | G06K 19/0723 |
| | | | | 340/572.1 |
| 7,907,899 B1* | 3/2011 | Oliver | ............... | G06K 19/0723 |
| | | | | 327/343 |
| 8,292,185 B2* | 10/2012 | Ng | ............... | G06K 19/0723 |
| | | | | 235/476 |
| 8,588,682 B2* | 11/2013 | Wilson | ............... | G05F 1/46 |
| | | | | 323/267 |
| 2009/0141518 A1* | 6/2009 | Klapf | ............... | G06K 19/07749 |
| | | | | 363/13 |
| 2010/0103707 A1* | 4/2010 | Bates | ............... | G06K 19/0701 |
| | | | | 363/73 |

* cited by examiner

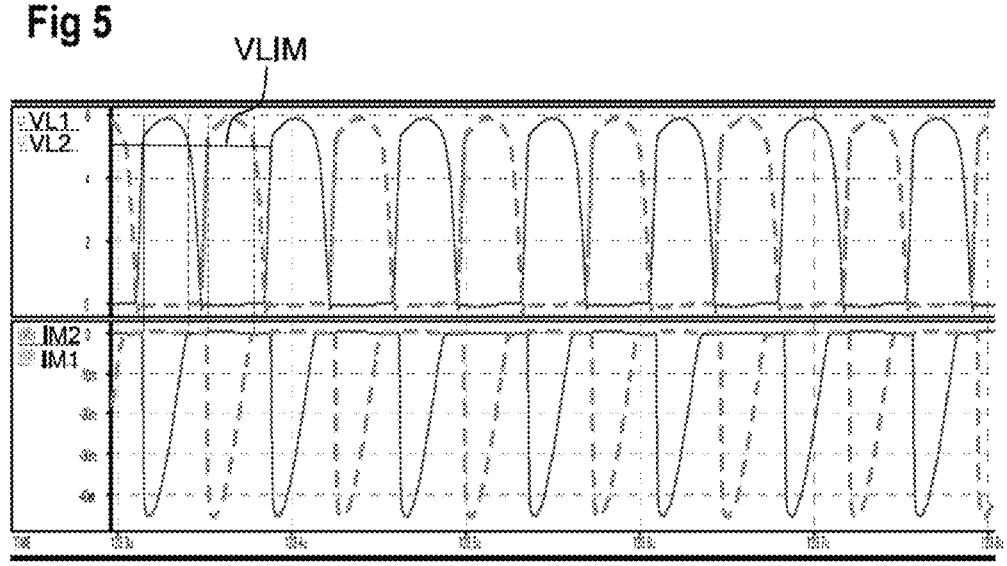

RADIO FREQUENCY SYSTEM AND METHOD FOR LIMITING A VOLTAGE

The present invention is related to a radio frequency system with a voltage limiter and to a method for limiting a voltage between antenna terminals. Particularly, such radio frequency systems may be radio frequency identification, RFID, systems.

BACKGROUND OF THE INVENTION

In many radio frequency applications, a voltage at antenna terminals of a radio frequency system is used and processed. For example, in RFID systems, in particular RFID transponders, the voltage at the antenna terminals is generated by inductive coupling of an RFID reader. However, to process the voltage at the antenna terminals, usually some limits regarding voltage, in particular overvoltage, have to be obeyed in order to avoid damage of connected circuits. To this end, such systems usually comprise an overvoltage limiter that shorts the antenna terminals if a predetermined voltage limit is exceeded.

However, shorting of the antenna terminals can lead to negative influence on the signal form of the signal present at the antenna terminals, which may also comprise information to be received or transmitted.

SUMMARY OF THE INVENTION

The present disclosure provides an improved concept for voltage limiting with radio frequency systems, in particular RFID systems, which interalia overcomes the problems of current solutions.

The improved concept is based on the idea that instead of a direct short circuit between the input terminals, i.e. the antenna terminals, at which the voltage is to be limited, the voltage at the input terminals is brought to a predefined voltage which is set via a bias voltage. Such a bias voltage is controlled via a voltage controller that regulates the bias voltage by varying the resistance of a regulation transistor or a current source in a closed loop depending on a reference voltage. For example, the regulation transistor or current source is connected to a reference potential terminal, e.g. a ground potential terminal. Due to the controlled bias voltage, unwanted influence on the signal at the input terminals is reduced.

Furthermore, the potential at the terminals having the bias voltage can be used for branching off of some of the current for other purposes. Due to the regulation of the bias voltage, such branching off has only little influence on the signal at the input terminals. Furthermore, energy of the branched-off current can be utilized effectively instead of being lost. For example, the branched-off current can be used for charging a battery of a radio frequency system or the like.

In an embodiment according to the improved concept, a voltage limiter in an inductive radio frequency system comprises a first and a second input terminal for receiving an input voltage. A first diode element is connected between the first input terminal and a bias terminal. A second diode element is connected between the second input terminal and the bias terminal. A regulation transistor is connected between the bias terminal and a reference potential terminal. A voltage controller has a reference input for receiving a reference signal, a feedback input connected to the bias terminal, and a control output for providing a control potential to a control terminal of the regulation transistor. The control potential is generated on the basis of the reference signal and a signal at the bias terminal. For example, a feedback voltage is generated on the basis of the voltage at the bias terminal, for instance with a voltage divider, and compared to the reference signal.

In a specific embodiment the voltage limiter further comprises a controllable branch device that is connected between the bias terminal and a branch terminal for providing a branch current thereto.

For example, a current resulting from an overvoltage at the input terminals can be at least partially used as the branch current by an electrical consumer connected to the branch terminal. For instance, the current can be used for charging a rechargeable battery acting as a power supply for a radio frequency device, or any other energy storage. Hence, the voltage limiter according to the improved concept can also be used as an energy harvesting system for storing energy transmitted by a radio frequency transmitter and received at the input terminals.

For example, the branch device comprises at least one branch transistor, a controlled section of which is connected between the bias terminal and the branch terminal and which is controlled on the basis of the control potential. In some example implementations, the control potential may be directly used for controlling the at least one branch transistor. Preferably, the at least one branch transistor is of the same conduction type as the regulation transistor, for example, a p-channel field effect transistor. If more branch transistors are used, preferably all of the branch transistors are of the same conduction type. However, a size, respectively, a current capability of the branch transistor and the regulation transistor may be different.

In some implementations the at least one branch transistor is further controlled on the basis of a selection signal. For example, the selection signal controls whether the at least one branch transistor can be turned on or off, e.g. by controlling the provision of the respective control signal in a switchable fashion. Hence, the branch current can be switched on or off depending on whether it can be utilized in a current consumer.

In some implementations the branch device comprises at least two branch transistors, for example the at least one branch transistor and a further branch transistor. In such a configuration a controlled section of the further branch transistor is connected between the bias terminal and the branch terminal, wherein the further branch transistor is controlled on the basis of the control potential and of the basis of the selection signal, for instance as described before for a single branch transistor. Further branch transistors can be controlled in a similar fashion.

The use of several, preferably similar, branch transistors allows to control the amount of current, respectively a percentage of current, to be provided to the branch terminal, in particular if the branch transistors have a predefined and known current capability.

Accordingly, in some implementations, the branch device is configured to switch the at least one branch transistor or each of the branch transistors between an on-position and an off-position on the basis of the selection signal.

In other implementations, the branch transistor may be controlled in an analog fashion by varying the control potential depending, for instance, on an amount of current needed by a current consumer or a load.

In the embodiments described above employing a branch device, the energy resulting from an overvoltage at the input terminals may be used efficiently for energy harvesting.

In various embodiments the first and the second diode elements may be implemented as Schottky diodes having a low forward voltage. However, in some implementations it may be advantageous to use diode-connected transistors that, for example, have connected their control terminal to the bias terminal. Depending on the desired application, the transistors may be bipolar transistors, bipolar junction transistors, BJT, or field effect transistors like MOS transistors.

For instance, in some implementations the first and the second diode element are implemented as field effect transistors having their gate terminal directly connected to the bias terminal and having their bulk terminal connected to an external bulk limiter terminal of the voltage limiter. For instance, the highest possible voltage present in the system may be provided to a bulk limiter terminal, such that the conduction behaviour of the diode elements inter alia depends on that bulk potential. For example, if a rectifier is connected to the voltage limited input terminals, the output voltage of the rectifier following the peaks of an oscillating input signal may constitute the highest available voltage potential in the system. This may result in the reduction of potential current spikes within the circuit. Such rectifier may be the main system rectifier that supplies a device of e.g. a passive RFID tag.

In further embodiments where the diode elements are implemented as diode-connected transistors of any type, the voltage limiter further comprises a first modulation transistor which is connected between the first input terminal and the modulation output, and a second modulation transistor, which is connected between the second input terminal and the modulation output. Respective control terminals of the first and the second modulation transistor are connected to the bias terminal. Hence, a current through the first diode element, respectively the first diode-connected transistor, is mirrored to the first modulation transistor, whereas a current through the second diode element, respectively the second diode-connected transistor, is mirrored to the second modulation transistor, due to their current mirror connection.

In some practical implementations where the voltage limiter according to the improved concept is used, some kind of unwanted dependencies like temperature dependencies may occur which may result in the shifting of the voltage to be limited. In order to avoid such shifting, provision of an adapted reference signal to the voltage controller may counteract other dependencies.

For example, the radio frequency system comprising the voltage limiter further comprises a reference signal generator that is adapted to generate the reference signal with a temperature coefficient being counterbalancing to a temperature coefficient of the first and the second diode element. Additionally, or as an alternative, other dependencies or dependencies of other elements may be counterbalanced by the reference signal generator.

A voltage limiter according to the improved concept, as described in one of the embodiments above, may be used with any circuit or device which needs a voltage limitation at its input terminals. According to the present example embodiment, the voltage limiter is used with a radio frequency system.

A radio frequency system according to the improved concept hence comprises a voltage limiter according to one of the implementations described above with a first antenna terminal connected to the first input terminal and with a second antenna terminal connected to the second input terminal of the voltage limiter. The radio frequency system further comprises a radio frequency transceiver that is coupled to the first and the second antenna terminal and a charging control with a current terminal and with a battery terminal for connecting a battery, in particular a rechargeable battery. In such an implementation the voltage limiter comprises a controllable branch device, for example as described above, that is connected between the bias terminal and the branch terminal for providing the branch current to the branch terminal, which is connected to the current terminal of the charging control. The charging control is configured to use the branch current, at least partially, as a charging current provided to the battery terminal. Hence, a current resulting from an overvoltage can be utilized for charging a battery that serves as a power supply for the radio frequency system.

For example, with an implementation of the voltage limiter having one or more branch transistors being controlled on the basis of a selection signal, the radio frequency system is configured to generate a selection signal on the basis of a charging state of a battery connected to the battery terminal. For example, if the battery has a low charging state, the branch transistor is turned on via the selection signal such that its branch current can be used for charging the battery. If more branch transistors are present, a higher number of branch transistors, for example all of the branch transistors, can be selected for providing the branch current in the low charging state of the battery. If a higher charging state is achieved, the resulting branch current to be achieved can be reduced, e.g. by reducing the number of selected branch transistors or by regulating a current through the branch transistors.

In some implementations of a radio frequency system according to the improved concept, the voltage limiter is implemented with field effect transistors as first and second diode elements as described above. The radio frequency system further comprises a rectifier connected to the first and the second antenna terminal, wherein an output of the rectifier is connected to the bulk limiter terminal of the voltage limiter which is connected to the bulk terminals of the field effect transistors.

For example, as the load that draws the current from such rectifier shares the power with the limiter current, the current through the branch transistors can also automatically be controlled via feedback action, for instance depending on a loading current in various of an RFID tag's modes of operation.

As an alternative or in addition to the embodiments described above, the radio frequency system may be implemented with a voltage limiter further comprising the first and the second modulation transistors as described above. In such a configuration the radio frequency transceiver is connected to the modulation output and configured to perform a demodulation of a signal at the first and the second antenna terminal on the basis of a signal at the modulation output. For example, the current portions which are mirrored to the modulation transistors from the diode-connected transistors directly carry modulation information which may be used by the radio frequency transceiver for reconstructing information contained in a modulated signal received at the antenna terminals.

In an embodiment of a method for limiting a voltage at a first and a second antenna terminal of a radio frequency system according to the improved concept, a first diode element connected between the first antenna terminal and a bias terminal is provided. Similarly, a second diode element being connected between the second antenna terminal and the bias terminal and a controlled current source between the bias terminal and the reference potential terminal are provided. Taking a signal at the bias terminal as a basis, a feedback signal is generated, for instance using a voltage divider or the like. A control signal for controlling the controlled current source is generated on the basis of a comparison between the feedback signal and a reference signal.

In some specific implementations of the method, a branch current is provided from the bias terminal to an electrical load on the basis of the control signal. For example, the branch current is provided to a battery charger.

Further embodiments of the method become apparent from the various embodiments of the voltage limiter and the radio frequency system described above.

The invention is described in more detail with reference to the drawings in the following figures. Same elements or same functional blocks having identical or similar functions are referenced with the same reference signs. If such elements are described for one figure, further detailed description may be omitted in the following figures.

BRIEF DESCRIPTION OF THE DRAWINGS

In the drawings
FIG. 5 shows a signal diagram of signals within a radio frequency system.

DETAILED DESCRIPTION

Figure 1:
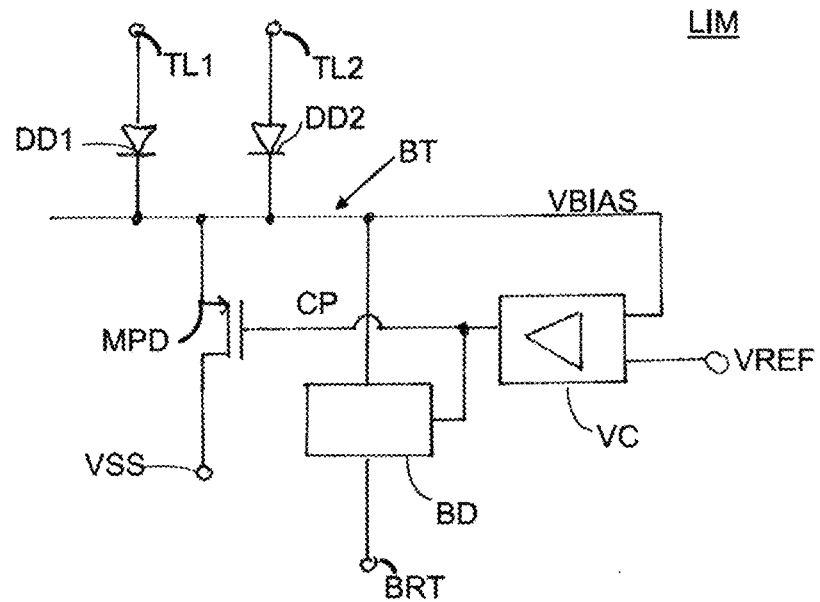
FIG. 1 shows an embodiment of a voltage limiter.

FIG. 1 shows an exemplary embodiment of a voltage limiter LIM that is intended for limiting a voltage at input terminals TL1, TL2. For example, such a voltage limiter can be used with a radio frequency system wherein the input terminals TL1, TL2 are connected to respective antenna terminals of the radio frequency system.

The voltage limiter LIM comprises a first diode element DD1 and a second diode element DD2 which are directly connected between the first input terminal TL1, respectively the second input terminal TL2 and a bias terminal BT. Furthermore, a controlled current source or regulation transistor MPD is provided between the bias terminal BT and a reference potential terminal VSS. In this implementation the controlled current source is implemented as a p-channel field effect transistor or MOS transistor having its source terminal connected to the bias terminal BT, its drain terminal connected to the reference potential terminal VSS and its gate terminal connected to an output of a voltage controller VC. The voltage controller VC has a reference input for receiving a reference signal VREF, a feedback input for receiving a signal at the bias terminal BT which is a bias voltage VBIAS. The voltage controller VC is configured to generate a control potential CP, which is provided to a gate terminal of the regulation transistor MPD, on the basis of the reference signal and the bias voltage VBIAS.

Although it may be advantageous to use a MOS transistor for the controlled current source, other implementations for the controlled current source such as bipolar transistors or bipolar junction transistors, BPT, or the like can be used as an alternative.

The voltage limiter LIM further comprises a branch device BD which is connected between the bias terminal BT and a branch terminal BRT and has a control input for receiving the control potential CP. The branch device BD may be omitted in various implementations.

During operation of the voltage limiter LIM the voltage controller VC controls the regulation transistor MPD such that a distinct, fixed bias voltage VBIAS is achieved at the bias terminal BT. Such a desired bias voltage VBIAS is achieved when one of the voltages at the input terminals TL1, TL2 is higher than the bias voltage VBIAS plus a respective forward voltage of the diode elements DD1, DD2. Hence, an exact voltage limit is set for the voltage limitation at the input terminals TL1, TL2. The overvoltage is therefore removed by a current through the diode elements DD1, DD2 and at least partially through the controlled regulation transistor MPD. This has the effect that a maximum voltage at the input terminals TL1, TL2 is regulated to a predefined voltage instead of simply shorting the input terminals as in conventional voltage limiters. Accordingly, a signal form at the input terminals TL1, TL2 is basically with limited influence from the voltage limiting, improving a processing of the voltage limited signals afterwards.

A current through the regulation transistor MPD ends at a reference potential terminal such that energy is lost by the current flow. However, due to the optional branch device BD, at least a part of the energy which is present due to the overvoltage can be utilized by an electrical consumer by providing a branch current from the bias terminal BT to the branch terminal BRT. The amount of current may be controlled based on the control potential CP. For example, the branch current may be provided to some sort of energy storage like a rechargeable battery through a battery charger. The amount of current may be controlled by the branch device BD.

It should be noted that even if a branch current is branched off the bias terminal BT, the regulation loop setting the bias voltage VBIAS with the regulation transistor MPD and the voltage controller VC is still operable. For example, if a specific current is used as the branch current, a current through the regulation transistor MPD is reduced accordingly compared to the situation where no branch current is branched off. With the application of the branch device BD, the voltage limiter LIM can be used as an energy harvester, particularly when higher oscillating voltages are present at the input terminals TL1, TL2, for example induced via an antenna coil.

Figure 2:
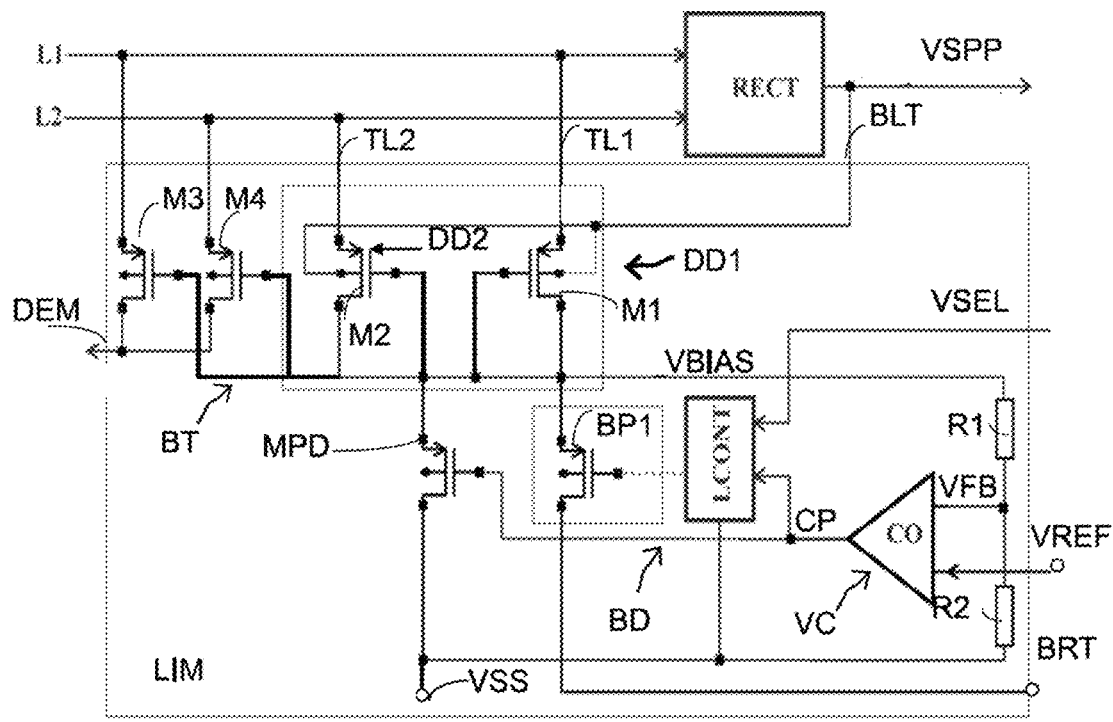
FIG. 2 shows a further embodiment of a voltage limiter in application with a rectifier.

FIG. 2 shows a further embodiment of a voltage limiter LIM that is based on the embodiment of FIG. 1. Additionally, the arrangement shown in FIG. 2 comprises a rectifier RECT connected to antenna terminals L1, L2 for connecting, for instance, an antenna coil. In the embodiment of FIG. 2, the first and the second diode elements DD1, DD2 are implemented as p-channel MOS transistors M1, M2 which have their gate and drain terminals connected to the bias terminal BT and therefore are operated in a diode configuration. The input terminals TL1, TL2 of the limiter LIM are connected respectively to the first and the second antenna terminal L1, L2.

The voltage controller VC comprises a comparing amplifier or error amplifier CO having a reference input for receiving the reference voltage VREF. A comparison input for receiving a feedback voltage is connected to a common connection of resistors R1, R2 that form a resistive voltage divider. The voltage divider R1, R2 is connected between the bias terminal BT and the reference potential terminal VSS for generating the feedback voltage VFB from the bias voltage VBIAS.

The branch device BD comprises at least one branch transistor BP1 which, in this embodiment, is implemented as a p-channel MOS transistor having its gate terminal connected to a branch control LCONT. Further branch transistors can be connected in parallel to the first branch transistor between the bias terminal BT and the branch terminal BRT, however, being controlled independently by the branch control LCONT. Preferably, the branch transistors are of the same type as the regulation transistor MPD.

The branch control LCONT comprises a first input for receiving the control potential and a second input for receiving a selection signal VSEL. A respective control voltage for the one branch transistor BP1 or more branch transistors is generated on the basis of the control potential CP and the selection signal VSEL. For example, the selection signal VSEL determines the amount or percentage of a current to be branched off as a branch current at the branch terminal BRT. For example, the branch control LCONT varies the control potential based on selection signal VSEL to achieve a desired branch current. In alternative embodiments, the selection signal determines whether the control potential is provided to one or more branch transistors or not. This will be explained in more detail below with reference to FIG. 3.

The voltage limiter LIM further comprises a first modulation transistor M3 connected between the first antenna terminal L1, respectively the first input terminal TL1, and a modulation output DEM, and a second modulation transistor M4 connected between the second antenna terminal L2, respectively the second input terminal TL2, and the modulation output DEM. The gate terminals of the first and the second modulation transistor M3, M4 are commonly connected to the bias terminal BT. In this configuration, a current through the first diode-connected transistor M1 is mirrored to the first modulation transistor M3, and a current through the second diode-connected transistor M2 is mirrored to the second modulation transistor M4. Hence, a current information resulting from a current due to the overvoltage is provided at the modulation output DEM.

For example, if modulated data are received via an antenna coil connected to the antenna terminals L1, L2, modulation information at the modulation output DEM can be used, for instance, by an RF demodulator circuit. Hence, while Schottky barrier diodes may also be used as diode elements, the current mirroring of the modulation information can only be performed by implementing the diode elements DD1, DD2 by diode-connected transistors.

In the specific implementation with MOS transistors M1, M2, the bulk connection of these transistors M1, M2 can be connected to a bulk limiter terminal BLT of the voltage limiter LIM, which is connected to an output of the rectifier RECT, where a voltage VSPP is present during operation. For example, the main full wave rectifier RECT is composed of a set of Schottky barrier diodes. It may provide its output voltage VSPP as a main supply voltage for a radio frequency frontend. Due to the voltage limitation, the voltage VSPP is always below the maximum allowed voltage for the technology used by the connected circuits, in particular the RF frontend.

The bulk connection of the PMOS transistors M1, M2 constitutes an n-well diode that is connected to the bulk limiter terminal BLT. When the voltage VSPP drops, for instance due to a current loading action, an extra current starts flowing from the terminals L1, L2 through transistors M1, M2. This results in a faster reaction time for controlling the bias voltage VBIAS and further limited influence on a signal at the terminals L1, L2. This is particularly useful if current spikes in connected circuits occur, as the rectified voltage VSPP recovers faster. It should be noted that the voltage VSPP is the highest potential or the highest available potential in the system.

A potential temperature dependency of the transistors M1, M2 and also M3, M4 may influence the generation of the bias voltage VBIAS and, in consequence, the limiting voltage at the terminals L1, L2. Hence, if this limiting voltage, which is the bias voltage VBIAS plus the diode voltage of transistors M1, M2, is to be set as temperature-independent, a temperature coefficient of a forward biased diode voltage of the transistors M1, M2 may be compensated by applying a temperature-dependent reference voltage VREF to the error amplifier CO, respectively the voltage controller VC. For example, the reference voltage VREF may be generated with a positive temperature coefficient that compensates a negative temperature coefficient of transistors M1, M2. Additionally, the reference voltage can also be made dependent on other devices or circuit paths such as a coil connected to the terminals TL1, TL2.

Figure 3:
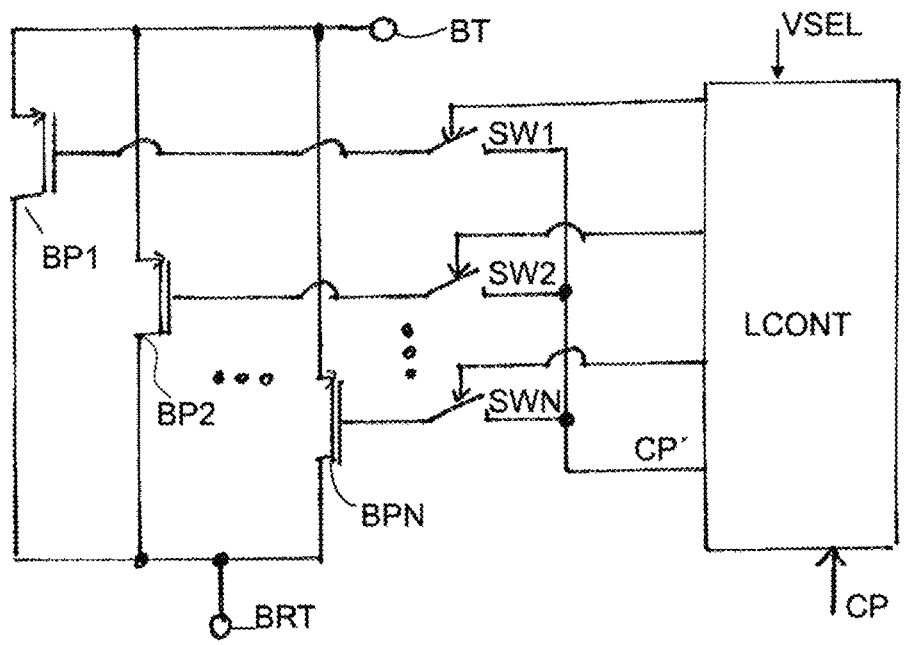
FIG. 3 shows an embodiment of a branch device.

FIG. 3 shows an example of a specific implementation of a branch device BD. Several branch transistors BP1, BP2, BPN are connected in parallel between the bias terminal BT and the branch terminal BRT. The gate terminals of the branch transistors BP1, BP2, BPN are selectively provided with a derived control potential CP' that is generated from the controlled potential CP by the branch control LCONT. To this end, respective switches SW1, SW2, SWN are provided, one for each gate terminal. The respective switching signals for these switches SW1, SW2, SWN are generated by the branch control LCONT depending on the selection signal VSEL. For example, the higher a current to be branched off should be, the more switches are closed depending on the selection signal VSEL.

The number of three branch transistors BP1, BP2, BPN shown in FIG. 3 is selected arbitrarily but can be lower or particularly higher, as indicated by the ellipsis in FIG. 3.

Figure 4:
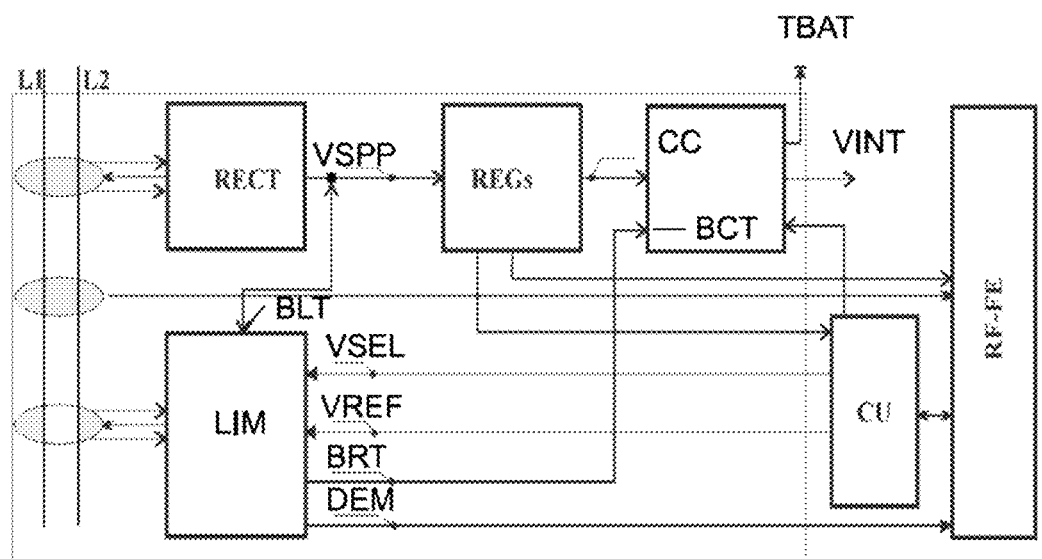
FIG. 4 shows an embodiment of a radio frequency system.

FIG. 4 shows an exemplary embodiment of a radio frequency system implementing the voltage limiter as described before. To this end, the radio frequency system comprises the voltage limiter LIM, the rectifier RECT, a regulator block REG, a charge control CC, a control unit CU and a radio frequency frontend RF-FE which may be implemented as a radio frequency transceiver. For example in the signal chain of the rectifier RECT, the regulator block REG and the charge control CC, an internal voltage VINT may be generated serving as a supply voltage for circuits of the radio frequency system. Furthermore, the radio frequency fronted RF-FE is directly connected to the antenna terminals L1, L2. The reference voltage VREF and the selection signal VSEL are provided to the voltage limiter LIM by the control unit CU being in connection with the charge control CC.

The charge control CC has a current terminal BCT that is connected to the branch terminal BRT for receiving the branch current. Furthermore, the charging control CC comprises a battery terminal TBAT, to which a rechargeable battery or other energy storages can be connected. The charging control CC is configured to utilize the branch current at least partially as a charging current for an energy storage connected to the battery terminal. Due to the interaction between the charging control CC and the control unit CU, the selection signal may be generated on the basis of a charging state of a battery connected to the battery terminal TBAT.

The radio frequency frontend is inter alia configured to perform a demodulation of a signal present at the antenna terminals L1, L2. To this end, the radio frequency frontend can use the signals at the antenna terminals L1, L2 directly and further utilizes an output signal of the voltage limiter LIM at the modulation output DEM, as described above.

Hence, the voltage limiter LIM in the RF system of FIG. 4 constitutes several functions like the primary voltage limiting function, an energy harvesting function and a demodulation support function. The RF system of FIG. 4 may, for example, be implemented as an RFID system, in particular an RFID transponder.

FIG. 5 shows an example of a signal diagram of signals present in the arrangement of FIG. 4. In the upper canvas, voltages VL1, VL2 at the first and the second antenna terminal L1, L2 are shown respectively with solid or dashed lines. In the lower canvas, the respective currents IM1, IM2 through the diode-connected transistors M1, M2 resulting from a limited overvoltage, are shown. As can be seen, the currents IM1, IM2 only have a significant value if the limiting voltage VLIM is exceeded. In contrast, in conventional solutions wherein the antenna terminals are simply shorted, current flows even under a desired limiting voltage, effectively resulting in a current loss and in a severely negative influence on the signal at the antenna terminals L1, L2. This leads to a distortion and energy loss below the limiting level of, for instance, sine waves, in the conventional solutions, which is avoided with the solution according to the improved concept. Furthermore, more energy is available to be harvested according to the improved concept.

In the embodiments described above, the voltage limiter with its energy-harvesting function converts an incoming RF energy, which is drawn from an electromagnetic field of, e.g., an interrogator, into a DC voltage with a required power to efficiently supply the radio frequency system, and charge a battery or a capacitive storage device. As the voltage at the input terminals, respectively an antenna coil, may exceed the maximum voltage specified for a technology used, the control of an overvoltage on the antenna terminals of the radio frequency system is achieved by the voltage limiter. The voltage limiter operates as a voltage regulator that utilizes a voltage from the controlled rectifier M1, M2 to a stable DC voltage level VBIAS, independent of input power. This voltage VBIAS is set for the controlled rectifier. A voltage controller, e.g. an error amplifier CO, compares the reference voltage VREF and a voltage from a feedback resistor divider R1, R2 and regulates the amount of the current to be bypassed or delivered to the battery charger or to a load. The branch device may comprise several transistors acting as pass elements. A function of the voltage limiter will become active and current will flow into the voltage limiter only if the input voltage from the antenna terminals L1, L2 exceeds a maximum voltage for the chosen technology, meaning that there is no power limitation as long as the input voltage is below the certain level. Furthermore, there is no power drain in the voltage limiter as long as the load or a charging current is sufficiently high to keep the input voltage below a maximum value. In the case of higher input power, the voltage limiter shares the power with the loading devices connected to the output VSPP of rectifier RECT. Also, if the loading current, e.g. for charging, is maximal, the limiter bypasses the extra current from the input source that is controlled by the voltage controller VC to keep the reference of the voltage limiter stable.

The charging control may be driven by the voltage regulator REG following the full wave rectifier RECT, which also may supply the bulk limiting terminal. The charging control may operate in two distinct modes, namely a current charging mode and a voltage charging mode. In both modes, the current is progressively decreasing as the battery voltage approaches a final value. For example, a regulator voltage in the charge controller is set to a battery nominal charge voltage.

In the embodiments of the voltage limiter LIM described above, the distinct functions of the voltage limiter regarding modulation transistors, implementation of the diode elements DD1, DD2 and the implementation of the branch device BD can be selectively omitted or combined, if they do not depend directly on each other. Such combinations are apparent for the skilled reader.

The invention claimed is:

1. A radio frequency system with a first antenna terminal, a second antenna terminal, a radio frequency transceiver coupled to the first and the second antenna terminal, a rectifier connected to the first and the second antenna terminal at its input side and a voltage limiter connected to the first and the second antenna terminal at its input side, the voltage limiter comprising a first input terminal connected to the first antenna terminal;
a second input terminal connected to the second antenna terminal;
a first diode element connected between the first input terminal and a bias terminal;
a second diode element connected between the second input terminal and the bias terminal;
a regulation transistor connected between the bias terminal and a reference potential terminal; and
a voltage controller with a reference input for receiving a reference signal, with a feedback input connected to the bias terminal and with a control output for providing a control potential to a control terminal of the regulation transistor on the basis of the reference signal and a signal at the bias terminal.

2. The radio frequency system according to claim 1, wherein the voltage limiter further comprises a controllable branch device connected between the bias terminal and a branch terminal for providing a branch current to the branch terminal.

3. The radio frequency system according to claim 2, further comprising a charging control with a current terminal connected to the branch terminal and with a battery terminal for connecting a battery, wherein the charging control is configured to use the branch current at least partially as a charging current provided to the battery terminal.

4. The radio frequency system according to claim 2, wherein the branch device comprises at least one branch transistor, a controlled section of which is connected between the bias terminal and the branch terminal and which is controlled on the basis of the control potential.

5. The radio frequency system according to claim 4, wherein the at least one branch transistor is further controlled on the basis of a selection signal.

6. The radio frequency system according to claim 5, wherein the branch device comprises a further branch transistor, a controlled section of which is connected between the bias terminal and the branch terminal and which is controlled on the basis of the control potential and on the basis of the selection signal.

7. The radio frequency system according to claim 5, wherein the branch device is configured to switch the at least one branch transistor between an on-position and an off-position on the basis of the selection signal.

8. The radio frequency system according to claim 5, further comprising a charging control with a current terminal connected to the branch terminal and with a battery terminal for connecting a battery, wherein the charging control is configured to use the branch current at least partially as a charging current provided to the battery terminal, wherein the radio frequency system is configured to generate the selection signal on the basis of a charging state of a battery connected to the battery terminal.

9. The radio frequency system according to claim 1, wherein the first and the second diode element are implemented as field effect transistors having their gate terminal directly connected to the bias terminal and having their bulk terminal connected to an external bulk limiter terminal of the voltage limiter.

10. The radio frequency system according to claim 9, wherein an output of the rectifier is connected to the bulk limiter terminal.

11. The radio frequency system according to claim 1, wherein the first and the second diode element are implemented as transistors having their control terminal directly connected to the bias terminal;

the voltage limiter further comprises a first modulation transistor, which is connected between the first input terminal and a modulation output, and a second modulation transistor, which is connected between the second input terminal and the modulation output; and respective control terminals of the first and the second modulation transistor are connected to the bias terminal.

12. The radio frequency system according to claim 11, wherein the radio frequency transceiver is connected to the modulation output and configured to perform a demodulation of a signal at the first and the second antenna terminal on the basis of a signal at the modulation output.

13. The radio frequency system according to claim 1, further comprising a reference signal generator that is adapted to generate the reference signal with a temperature coefficient being counterbalancing to a temperature coefficient of the first and the second diode element.

14. A method for limiting a voltage at a first and a second antenna terminal of a radio frequency system, which has a rectifier connected to the first and the second antenna terminal at its input side, the method comprising:

providing a first diode element connected between the first antenna terminal and a bias terminal;

providing a second diode element connected between the second antenna terminal and the bias terminal;

providing a controlled current source between the bias terminal and a reference potential terminal;

generating a feedback signal on the basis of a signal at the bias terminal; and generating a control signal for controlling the controlled current source on the basis of a comparison between the feedback signal and a reference signal.

15. The method according to claim 14, further comprising providing, on the basis of the control signal, a branch current from the bias terminal to an electrical load, in particular a battery charger.

16. The method according to claim 15, further comprising using the branch current at least partially as a charging current for charging a battery of the radio frequency system.

17. The method according to claim 16, wherein the branch current is provided further on the basis of a selection signal, which is generated on the basis of a charging state of the battery.

18. The method according to claim 14, wherein the reference signal is generated with a temperature coefficient being counterbalancing to a temperature coefficient of the first and the second diode element.

19. The method according to claim 14, wherein the first and the second diode element are provided in addition to the rectifier of the radio frequency system.

* * * * *